Feb. 13, 1940.    E. C. McDANIEL    2,189,864
TRAILER HITCH
Filed Jan. 31, 1938
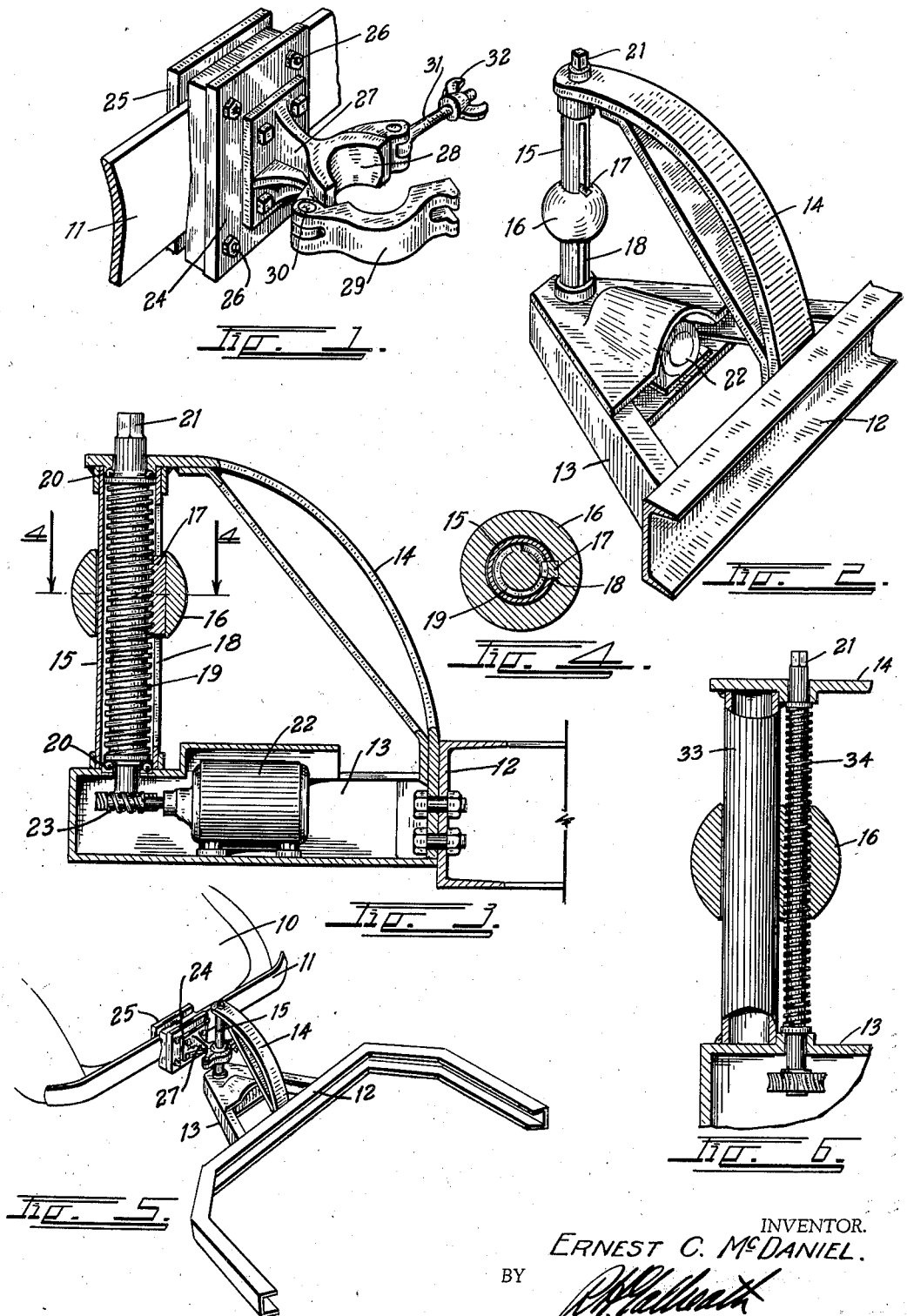
INVENTOR.
ERNEST C. McDANIEL.
BY
ATTORNEY.

Patented Feb. 13, 1940

2,189,864

UNITED STATES PATENT OFFICE 2,189,864

TRAILER HITCH

Ernest C. McDaniel, Denver, Colo., assignor, by mesne assignments, to Trailwagons Incorporated, Denver, Colo., a corporation of Colorado Application January 31, 1938, Serial No. 187,856

4 Claims. (Cl. 280—33.44)

This invention relates to a hitch for trailers, that is, a device for hitching a trailing vehicle to a pulling vehicle. The invention is particularly applicable to the type of trailer illustrated in the applicant's copending application, Serial No. 167,105, filed Oct. 4, 1937, of which the present application is a continuation in part.

The usual automobile trailer consists of a two wheeled vehicle attached at its forward extremity to an automobile. The automobiles are of different heights and the trailers are of different heights. The latter heights vary according to different loads in the trailer. All of these conditions act to make it difficult to maintain the trailer level under all conditions.

The principal object of this invention is to provide a hitch mechanism which can be employed between any trailer and any automobile regardless of their differences in heights and which can be actuated to level the trailer under any conditions of loading.

With the usual trailer the rear extremity thereof will strike the road whenever the towing vehicle rises over a hump or other raised place in the road. This is especially true when driving from a roadway through a gutter into a filling station or garage.

Another object of this invention is to provide a hitch mechanism by means of which the user can quickly and easily raise or lower the rear extremity of the trailer to prevent it from striking the road whenever uneven surfaces are encountered.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view illustrating the automobile portion of the invention.

Fig. 2 is a perspective view thereof illustrating the trailer portion of the invention.

Fig. 3 is a vertical, longitudinal section through the trailer portion.

Fig. 4 is a detail cross section taken on the line 4—4, Fig. 3.

Fig. 5 is a fragmentary perspective view illustrating the device in use in the complete assembled position.

Fig. 6 is a vertical section illustrating an alternate form of the invention.

A typical automobile is indicated at 10 with its bumper bar at 11 and the forward portion of a trailer chassis at 12. In applying the preferred form of the invention to the trailer chassis 12, a V-shaped bracket member 13 is secured to and projected forwardly from the chassis 12.

A curved brace arm 14 is extended upwardly and forwardly from the chassis 12 over the bracket member 13, terminating over the forward apex thereof. A stationary tubular shaft 15 extends vertically from the brace arm 14 to the bracket member 13 upon which a ball 16 is movably mounted.

The ball 16 is provided with a threaded key 17 which extends inwardly through a guide slot 18 in the tubular shaft 15. The key engages threads in a jack screw 19 journalled within the shaft 15 upon suitable bearings 20.

The jack screw 19 may be rotated by hand through the medium of a wrench extremity 21 or may be rotated by means of an electric motor 22 through the medium of suitable transmission gears 23. It can be readily seen that the vertical position of the ball 16 can be readily changed by rotation of the jack screw 19.

The automobile portion of the device comprises a bumper plate 24 arranged to be clamped to the bumper bar 11 by means of a clamping plate 25 and clamping bolts 26. The plate 24 supports a ball socket member 27 in the face of which is a hemi-spherical concavity 28 for receiving the ball 16. The ball is clamped in place in the concavity by means of a clamping member 29 which is hinged to the member 27 upon a suitble hinge pin 30 and which contains a corresponding hemi-spherical concavity for engaging the ball. The clamping member 29 is clamped about the ball through the medium of a clamp screw 31 and a clamp nut 32. When the ball is clamped in place, as shown in Fig. 5, it is free to move in every direction so that a universal attachment is provided.

It can be seen that the forward extremity of the trailer can be raised and lowered as desired by simply rotating the jack screw 19. If the electric motor is employed, it can be controlled from the driver's position so that when driving into a place where the rear of the trailer might strike the ground, the driver can energize the motor to force the ball upwardly thereby raising the rear extremity of the trailer. For ordinary road driving, the ball can be quickly and easily positioned at the proper elevation for level riding.

In Fig. 6 an alternate form of the invention is illustrated in which the same principles of operation are involved. In this form, a tubular shaft 33 is employed in place of the former shaft 15. The jack screw, however, indicated at 34, is positioned on the exterior of the shaft and is threaded through the ball. Rotation of the screw 34 serves the same purpose as rotation of the former screw 19.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A hitch for securing a trailer chassis to an automobile including: a bracket member projecting forward from said chassis; a brace arm projecting forwardly from said chassis above said bracket member; a stationary tubular shaft extending between said bracket member and said brace arm and supported rigidly vertical thereby; a rotatable threaded shaft extending longitudinally within said tubular shaft; a spherical ball through which said tubular shaft slidably passes; a threaded key on said ball extending inwardly to said threaded shaft through a longitudinal slot in said tubular shaft; a ball socket surrounding said ball; means for securing said ball socket to an automobile; and means for rotating said threaded shaft.

2. A hitch for securing a trailer chassis to an automobile including: a bracket member projecting forward from said chassis; a brace arm projecting forwardly from said chassis above said bracket member; a stationary tubular shaft extending between said bracket member and said brace arm and supported rigidly vertical thereby; a rotatable threaded shaft extending longitudinally within said tubular shaft; a spherical ball through which said tubular shaft slidably passes; a threaded key on said ball extending inwardly to said threaded shaft through a longitudinal slot in said tubular shaft; a ball socket surrounding said ball; means for securing said ball socket to an automobile; and an electric motor in said bracket member for rotating said threaded shaft.

3. A hitch for securing a trailer chassis to an automobile including: a bracket member projecting forward from said chassis; a brace arm projecting forwardly from said chassis above said bracket member; a stationary shaft extending between said bracket member and said brace arms and supported rigidly vertical thereby; a rotatable threaded shaft extending between said bracket member and said brace arm parallel and adjacent to said stationary shaft; a spherical ball with a threaded core through which said stationary shaft and said threaded shaft pass; a ball socket surrounding said ball; means for securing said ball socket to an automobile; and means for rotating said threaded shaft.

4. A hitch for securing a trailer chassis to an automobile including: a bracket member projecting forward from said chassis; a brace arm projecting forwardly from said chassis above said bracket member; a stationary shaft extending between said bracket member and said brace arm and supported rigidly vertical thereby; a rotatable threaded shaft extending between said bracket member and said brace arm parallel and adjacent to said stationary shaft; a spherical ball with a threaded core through which said stationary shaft and said threaded shaft pass; a ball socket surrounding said ball; means for securing said ball socket to an automobile; and an electric motor in said bracket member for rotating said threaded shaft.

ERNEST C. McDANIEL.